United States Patent
Ohtaka et al.

(10) Patent No.: US 9,081,949 B2
(45) Date of Patent: *Jul. 14, 2015

(54) INFORMATION PROCESSOR, AUTHENTICATION CONTROL METHOD, AND STORAGE MEDIUM

(71) Applicant: RICOH COMPANY, LTD., Ohta-ku (JP)

(72) Inventors: Yuuki Ohtaka, Kanagawa (JP); Satoru Nishio, Chiba (JP); Seijiro Hori, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 13/874,635

(22) Filed: May 1, 2013

(65) Prior Publication Data

US 2013/0254859 A1 Sep. 26, 2013

Related U.S. Application Data

(63) Continuation of application No. 13/457,209, filed on Apr. 26, 2012, now Pat. No. 8,479,273, which is a continuation of application No. 12/205,297, filed on Sep. 5, 2008, now Pat. No. 8,214,894.

(30) Foreign Application Priority Data

Sep. 11, 2007 (JP) ................................. 2007-235769

(51) Int. Cl.
*G06F 7/04* (2006.01)
*G06F 15/16* (2006.01)
(Continued)

(52) U.S. Cl.
CPC .............. *G06F 21/34* (2013.01); *H04L 9/3226* (2013.01)

(58) Field of Classification Search
CPC ... H04L 63/08; H04L 63/083; H04L 63/0861; G06F 21/32; G06F 21/31
USPC .............................................. 726/7
See application file for complete search history.

(56) References Cited

U.S. PATENT DOCUMENTS

2004/0128532 A1 7/2004 Ohishi et al.
2005/0091338 A1* 4/2005 de la Huerga ................. 709/217
(Continued)

FOREIGN PATENT DOCUMENTS

| JP | 2000-122975 A | 4/2000 |
|---|---|---|
| JP | 2003-242035 | 8/2003 |

(Continued)

OTHER PUBLICATIONS

Japanese Office Action issued May 29, 2012, in Patent Application No. 2007-235769.

(Continued)

*Primary Examiner* — William Powers
*Assistant Examiner* — Stephen Sanders
(74) *Attorney, Agent, or Firm* — Oblon, McClelland, Maier & Neustadt, L.L.P.

(57) ABSTRACT

An information processor is disclosed that includes an authentication part configured to authenticate a user based on predetermined information; an information obtaining part configured to obtain first information to be used to authenticate the user from an external device; and an authentication control part configured to cause the authentication part to authenticate the user by inputting information based on the first information to the authentication part as the predetermined information. The information obtaining part is configured to obtain the first information using a program module whose correlation with the information obtaining part is recorded in a recording medium.

20 Claims, 11 Drawing Sheets

(51) Int. Cl.
*G06F 17/30* (2006.01)
*H04L 29/06* (2006.01)
*G06F 21/34* (2013.01)
*H04L 9/32* (2006.01)

(56) References Cited

U.S. PATENT DOCUMENTS

2006/0075485 A1 4/2006 Funahashi et al.
2007/0234421 A1 10/2007 Ogino et al.
2009/0070855 A1 3/2009 Hori et al.

FOREIGN PATENT DOCUMENTS

| JP | 2003-256787 | 9/2003 |
|---|---|---|
| JP | 2004-122778 | 4/2004 |
| JP | 2004-234632 | 8/2004 |
| JP | 2004-295632 A | 10/2004 |
| JP | 2004-355332 | 12/2004 |
| JP | 2005-301360 | 10/2005 |
| JP | 2006-72664 | 3/2006 |
| JP | 2006-92437 | 4/2006 |
| JP | 2006-127457 | 5/2006 |
| JP | 2006-209232 A | 8/2006 |
| JP | 2006-215770 | 8/2006 |
| JP | 2007-122384 | 5/2007 |

OTHER PUBLICATIONS

Office Action issued Sep. 17, 2013 in Japanese Patent Application No. 2012-200685.
Japanese Office Action issued Apr. 30, 2014, in Japan Patent Application No. 2012-200685.

* cited by examiner

FIG.4

| | ENTRY INFORMATION |
|---|---|
| LOGIC IMPLEMENTING MODULE | |
| EXTERNAL DEVICE CONTROL IMPLEMENTING MODULE | ... |
| EXTERNAL DEVICE INFORMATION OBTAINING IMPLEMENTING MODULE | ... |
| EXTERNAL AUTHENTICATION PROCESSING IMPLEMENTING MODULE | ... |
| MAIN BODY AUTHENTICATION CONTROL IMPLEMENTING MODULE | ... |

INFORMATION PROCESSOR, AUTHENTICATION CONTROL METHOD, AND STORAGE MEDIUM

CROSS-REFERENCE TO RELATED APPLICATION

The present application is a continuation application of U.S. application Ser. No. 13/457,209, filed Apr. 26, 2012, which is a continuation application of U.S. application Ser. No. 12/205,297, filed Sep. 5, 2008, now U.S. Pat. No. 8,214,894, the entire contents of which are incorporated herein by reference. This application also claims priority to Japanese Application No. 2007-235769, filed Sep. 11, 2007.

BACKGROUND OF THE INVENTION

1. Field of the Invention

The present invention relates to an information processor, an authentication control method, and a storage medium.

2. Description of the Related Art

In recent years, it has been natural for companies to obtain standards in information security. There is also a strong demand for ensuring security for the functions of business machines used daily in companies. In view of such circumstances, some conventional image forming apparatuses (business machines having one or more functions of a copier, printer, scanner, facsimile machine, etc.) have a (built-in) user authentication function.

As user information items entered at the time of user authentication, such as a username and a password as typical examples, those entered in a manner unseeable by others are more preferable than those directly entered manually by a user in terms of security. Therefore, such solutions exist that cause user information to be entered using an external device such as an IC card as a typical example at the time of user authentication in the image forming apparatus. (See, for example, Patent Documents 1 through 3 listed below.)

On the other hand, it is often the case that an authentication system using a unique authentication server has already been constructed in the user environment of the image forming apparatus.

[Patent Document 1] Japanese Laid-Open Patent Application No. 2006-215770

[Patent Document 2] Japanese Laid-Open Patent Application No. 2007-122384

[Patent Document 3] Japanese Laid-Open Patent Application No. 2006-92437

According to the techniques described in Patent Documents 1 through 3, however, the processing performed by the IC card or the external authentication server and the processing performed by the image forming apparatus at the time of user authentication are fixed. Further, an available external device is also limited and fixed. Accordingly, the authentication function (authentication system) in the image forming apparatus and the authentication system in the user environment exist independent of each other. As a result, the system configuration becomes redundant, thus causing problems such as complication of maintenance work.

SUMMARY OF THE INVENTION

Embodiments of the present invention may solve or reduce one or more of the above-described problems.

According to one embodiment of the present invention, an information processor, an authentication control method, and a storage medium having an authentication control method recorded therein are provided in which one or more of the above-described problems may be solved or reduced.

According to one embodiment of the present invention, an information processor, an authentication control method, and a storage medium having an authentication control method recorded therein are provided that can implement a flexible authentication function.

According to one embodiment of the present invention, an information processor is provided that includes an authentication part configured to authenticate a user based on predetermined information; an information obtaining part configured to obtain first information to be used to authenticate the user from an external device; and an authentication control part configured to cause the authentication part to authenticate the user by inputting information based on the first information to the authentication part as the predetermined information, wherein the information obtaining part is configured to obtain the first information using a program module whose correlation with the information obtaining part is recorded in a recording medium.

According to one embodiment of the present invention, an authentication control method executed by an information processor having an authentication part configured to authenticate a user based on predetermined information is provided that includes the steps of (a) obtaining first information to be used to authenticate the user from an external device; and (b) causing step (a) to authenticate the user by inputting information based on the first information to the authentication part as the predetermined information, wherein step (a) obtains the first information using a program module whose correlation with step (a) is recorded in a recording medium.

According to one embodiment of the present invention, a computer-readable storage medium storing a program for causing a computer to execute an authentication control method using an authentication part configured to authenticate a user based on predetermined information is provided. The authentication control method includes the steps of (a) obtaining first information to be used to authenticate the user from an external device; and (b) causing step (a) to authenticate the user by inputting information based on the first information to the authentication part as the predetermined information, wherein step (a) obtains the first information using a program module whose correlation with step (a) is recorded in a recording medium.

Thus, according to one aspect of the present invention, it is possible to achieve a flexible authentication function. Further, it is possible to provide an information processor and an authentication control method capable of achieving a flexible authentication function, and a storage medium storing a program for causing a computer to execute the authentication control method.

BRIEF DESCRIPTION OF THE DRAWINGS

Other objects, features and advantages of the present invention will become more apparent from the following detailed description when read in conjunction with the accompanying drawings, in which:

FIG. 4 shows an example of the entry information of the logic implementing modules according to the embodiment of the present invention;

DETAILED DESCRIPTION OF THE PREFERRED EMBODIMENTS

A description is given, with reference to the accompanying drawings, of an embodiment of the present invention. In this embodiment, a description is given using an image forming apparatus as an example of the information processor.

Figure 1:
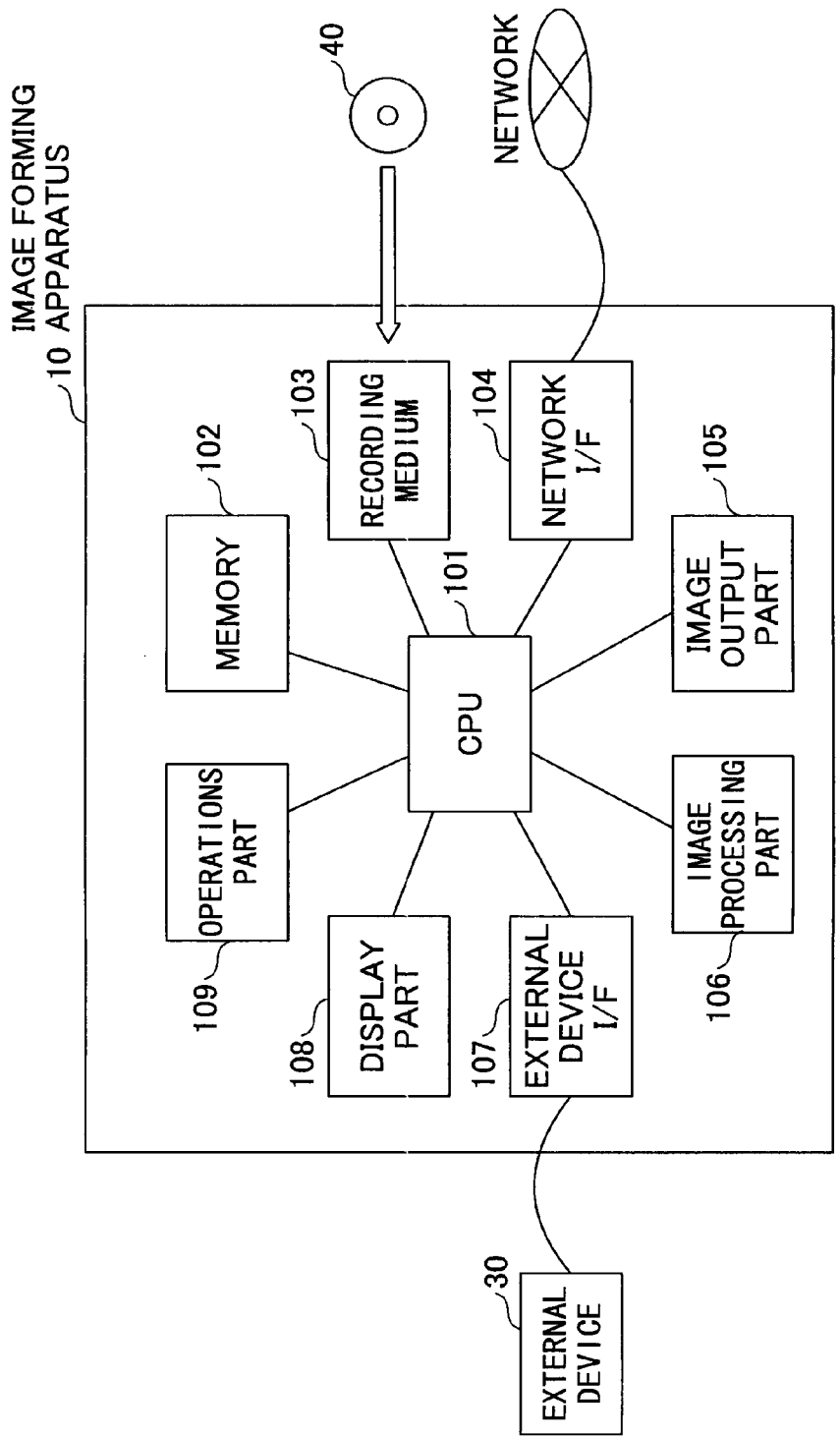
FIG. 1 is a diagram showing a hardware configuration of an image forming apparatus according to an embodiment of the present invention.

FIG. 1 is a diagram showing a hardware configuration of an image forming apparatus 10 according to the embodiment of the present invention.

Referring to FIG. 1, the image forming apparatus 10, which may be, but is not limited to, a printer, copier, or multifunction machine, includes a CPU 101, a memory 102, a recording medium 103, a network interface (I/F) 104, an image output part 105, an image processing part 106, an external device interface (I/F) 107, a display part 108, and an operations part 109.

A program that implements functions in the image forming apparatus 10 is recorded (installed) in the nonvolatile recording medium 103 such as a hard disk drive (HDD). For example, the program may be installed in the recording medium 103 from a storage medium 40 such as a CD-ROM or SD card through a drive unit (not graphically illustrated) or may be downloaded into the recording medium 103 through a network such as a local area network (LAN) or the Internet. The recording medium 103 contains the installed program as well as necessary files and data. The program is read from the recording medium 103 to be stored in the memory 102 in response to an instruction to start the program. The CPU 101 implements functions related to the image forming apparatus 10 in accordance with the program stored in the memory 102. The network I/F 104 is used as an interface for establishing a connection to the network.

The display part 108 includes an LCD (Liquid Crystal Display) and causes operations screens and messages to be displayed thereon. The operations part 109 may include hardware or mechanical buttons (keys) and accepts operational inputs by a user. The display part 108 and the operations part 109 may be formed as a unit as an operations panel.

The image processing part 106 executes image processing requested in outputting (printing) image data. The image output part 105 outputs (prints) image data.

The external device I/F 107 is an interface for establishing a connection to an external device 30 used to input user information for authentication. The external device I/F 107 includes, for example, a USB port or serial port. The external device 30, which is for entering user information, includes, for example, an IC card reader that reads an IC card with user information recorded therein, a USB memory, or a keyboard.

Figure 2:
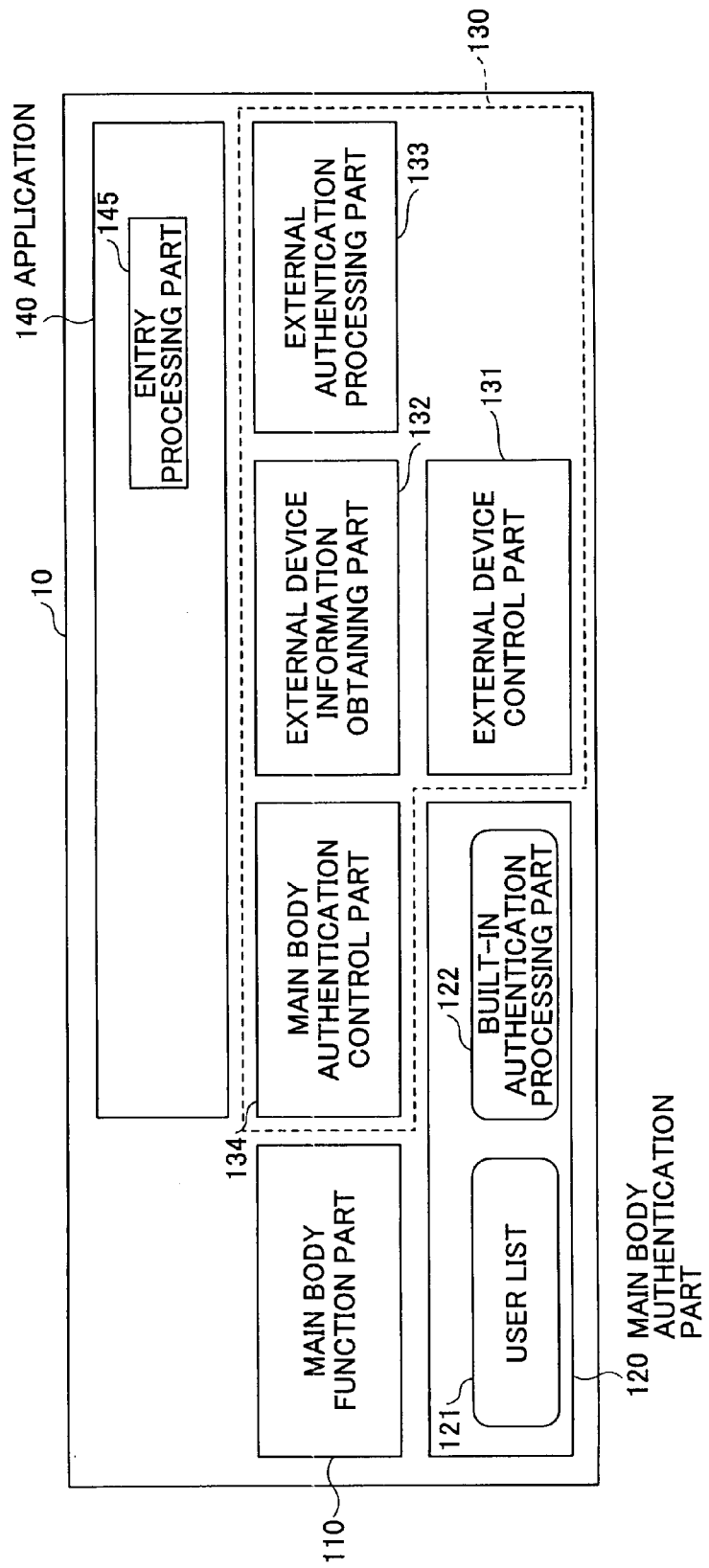
FIG. 2 is a diagram for illustrating a functional configuration of the image forming apparatus according to the embodiment of the present invention.

FIG. 2 is a diagram for illustrating a functional configuration of the image forming apparatus 10 according to the embodiment of the present invention.

Referring to FIG. 2, the image forming apparatus 10 includes a main body function part 110, a main body authentication part 120, a framework 130, and an application 140. Each of these is software implemented by the processing that the program causes the CPU 101 to execute.

The main body authentication part 120 includes a user list 121 and a built-in authentication processing part 122, and implements the built-in user authentication function of the image forming apparatus 10. The built-in user authentication function, which refers to the authentication function pre-incorporated in the image forming apparatus 10, is the function of authenticating a user who intends to operate the application 140 that runs on the image forming apparatus 10.

The built-in authentication processing part 122 controls the built-in user authentication processing. For example, the built-in authentication processing part 122 causes the display part 108 to display an authentication screen that prompts authentication. The user enters user information such as a username and a password on the authentication screen. The built-in authentication processing part 122 authorizes usage of the application 140 only if the user is authenticated based on the user information.

The user list 121 is information where user information and usage authority information are recorded user by user. That is, the built-in authentication processing part 122 authenticates a user by collating the user information entered by the user with the user information recorded in the user list 121. Further, the built-in authentication processing part 122 authorizes the authenticated user to use the functions that the user is allowed to use by the corresponding usage authority information recorded in the user list 121.

The above-described authentication function is built in the image forming apparatus 10 (as a default) in advance.

The framework 130 provides an execution environment for the application 140. According to this embodiment, an application developed by a third vender may be installed as the application 140 in the image forming apparatus 10 after its shipment. The framework 130 includes a class library (not graphically illustrated) for causing such an application to run.

For convenience, of the functions of the framework 130, only those related to the authentication function, such as an external device control part 131, an external device information obtaining part 132, an external authentication processing part 133, and a main body authentication control part 134, are shown in FIG. 2. Hereinafter, the framework related to the authentication function is referred to as "authentication framework." The authentication framework provides a mechanism for ensuring the flexibility and extensibility of the authentication function in the image forming apparatus 10. The authentication function implemented by the authentication framework is referred to as "extended authentication function" in contrast to the "built-in authentication function."

The external device control part 131 controls and communicates with the external device 30 connected to the image forming apparatus 10 through a USB interface or serial interface. The external device information obtaining part 132 obtains user information from the external device 30 through the external device control part 131. The external authentication processing part 133 communicates with an external authentication apparatus such as an authentication server through the network, and controls, for example, authentication using the authentication server. The authentication performed by the external authentication processing part 133 using an external authentication apparatus is referred to as "external authentication."

The main body authentication control part 134 implements authentication in the image forming apparatus 10. The authentication performed by the main body authentication control part 134 in the image forming apparatus 10 is referred to as "main body authentication."

The application 140 includes an application developed in compliance with the environment provided by the framework 130 in addition to applications prestored as the standard functions of the image forming apparatus (such as a printing application). Accordingly, although represented by a single rectangle in FIG. 2, the application 140 has multiple entities existing.

Each part forming the authentication framework in FIG. 2 merely provides its mechanism (frame), and actual processing (logic) is implemented by using a corresponding software module (hereinafter referred to as "logic implementing module") entered by an entry processing part 145 of the application 140 using the extended authentication function (which application is hereinafter referred to as "application 140a").

Figure 3:
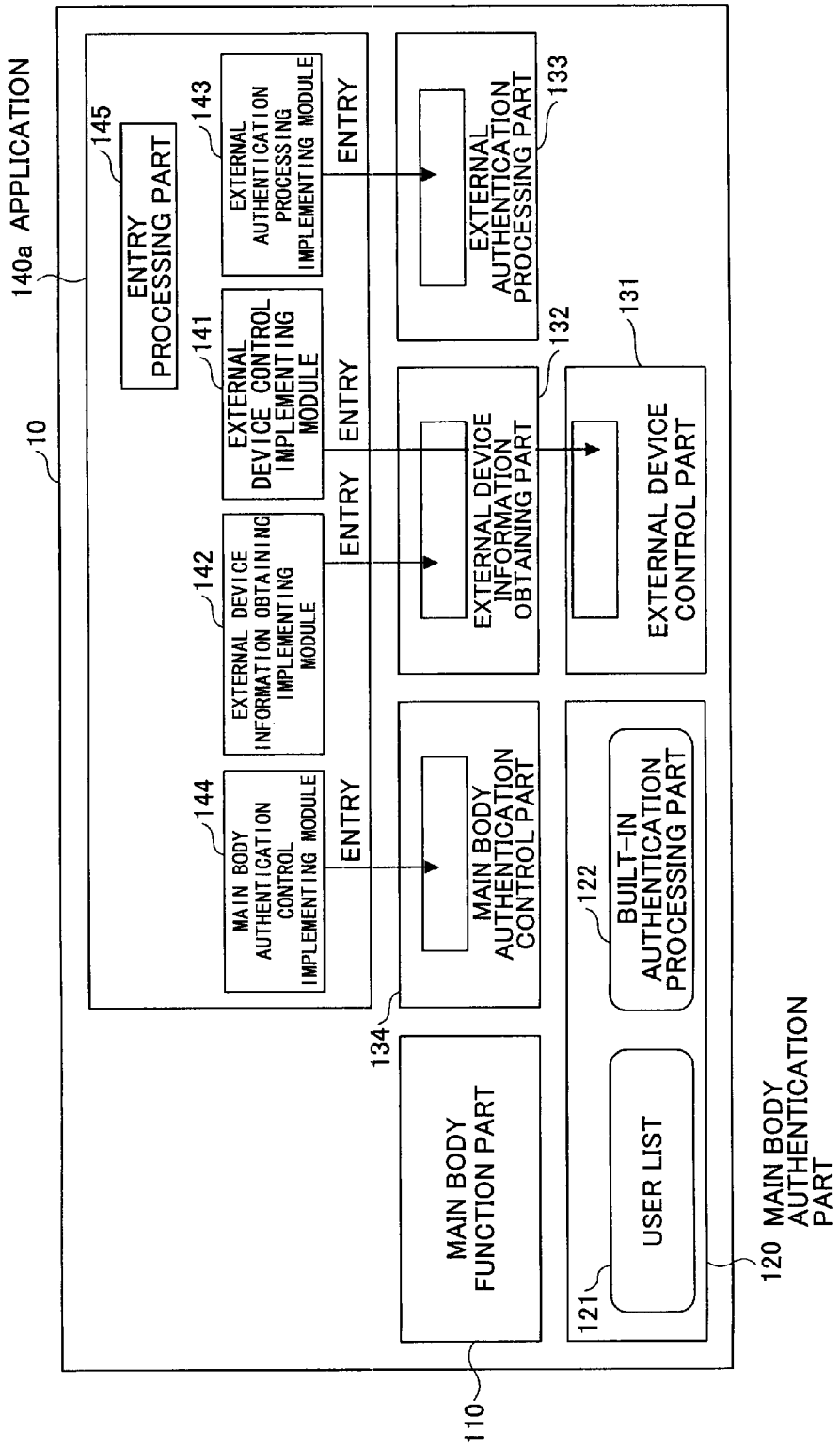
FIG. 3 is a conceptual diagram showing entry of logic implementing modules for an authentication framework according to the embodiment of the present invention.

FIG. 3 is a conceptual diagram showing entry of logic implementing modules for the authentication framework. Referring to FIG. 3, the application 140a includes an external device control implementing module 141, an external device information obtaining implementing module 142, an external authentication processing implementing module 143, and a main body authentication control implementing module 144.

The external device control implementing module 141, where the processing of communicating at the level of the interface of the external device 30 is implemented, is entered in the external device control part 131. For example, the driver program of a smart card reader used by a user may correspond to the external device control implementing module 141. Thus, implementing the external device control implementing module 141 makes it possible to support any external device 30.

The external device information obtaining implementing module 142, where the processing of obtaining information (user information) from the external device 30 is implemented, is entered in the external device information obtaining part 132. For example, the external device information obtaining implementing module 142 may be a program where the process of transmitting a command according to the format of the smart card of a user and receiving a response is implemented in order to obtain the user information recorded in the smart card. Thus, implementing the external device information obtaining implementing module 142 makes it possible to obtain user information from any external device 30.

The external authentication processing implementing module 143, where the processing related to authentication of user information using an external computer for authentication such as an authentication server is implemented, is entered in the external authentication processing part 133. For example, a program where the process of transmitting a serial number obtained from the smart card of a user to an LDAP (Lightweight Directory Access Protocol) authentication server and obtaining the username of the user is implemented may correspond to the external authentication processing implementing module 143. Thus, implementing the external authentication processing implementing module 143 makes it possible to support any authentication protocol.

The main body authentication control implementing module 144, where processing for achieving the main body authentication is implemented, is entered in the main body authentication control part 134. For example, such processing as causing authentication screen transition and inputting authentication information at the time of performing authentication using the built-in authentication function is implemented in the main body authentication control implementing module 144. A program where such processing is implemented as causing the message screen of "SET SMART CARD" to be displayed, causing transition to the message screen of "NOW AUTHENTICATING" in response to detection of a smart card, and in the meantime, inputting user information obtained from the smart card to the built-in authentication processing part 122 may correspond to the main body authentication control implementing module 144. Accordingly, implementing the main body authentication control implementing module 144 makes it possible to freely determine an authentication screen at the time of performing the built-in user authentication.

Further, a separate authentication function may be implemented in the main body authentication control implementing module 144 instead of using the built-in user authentication function. For example, a user database (DB) different from the user list 121 may be constructed in the recording medium 103, and such processing may be implemented as performing authentication using the user DB.

After inputting user information to the built-in authentication processing part 122, the built-in authentication processing part 122 performs user authentication. If the authentication succeeds, the built-in authentication processing part 122 unlocks the screen. If the authentication fails, the built-in authentication processing part 122 causes an authentication failure screen to be displayed. As a result of the unlocking of the screen, the user can perform operations on the application 140a.

Information on the entry of each logic implementing module into the authentication framework is, for example, recorded and managed in the recording medium 103. FIG. 4 shows an example of the entry information of the logic implementing modules. FIG. 4 shows the case where each logic implementing module is correlated with its corresponding entry information. The entry information may include information necessary for the authentication framework dynamically using (calling) the logic implementing module, such as a filename by which the entity of the logic implementing module is stored. In response to a request for processing, each part of the authentication framework determines the logic implementing module to be called referring to such entry information. Each logic implementing module may be implemented so as to be dynamically callable based on the interface (protocol for calling the logic implementing module) required by the authentication framework (defined in the authentication framework). If it is desired that the logic implementing modules to be used vary from application (140a) to application (140a), the entry information as shown in FIG. 4 may be managed, being correlated with the application 140a.

By having the above-described logic implementing module entered in each part of the authentication framework, it is possible to give variety to the part configured to input user information to the built-in user authentication.

Next, a description is given of processes of the image forming apparatus 10 according to this embodiment.

Figure 5:
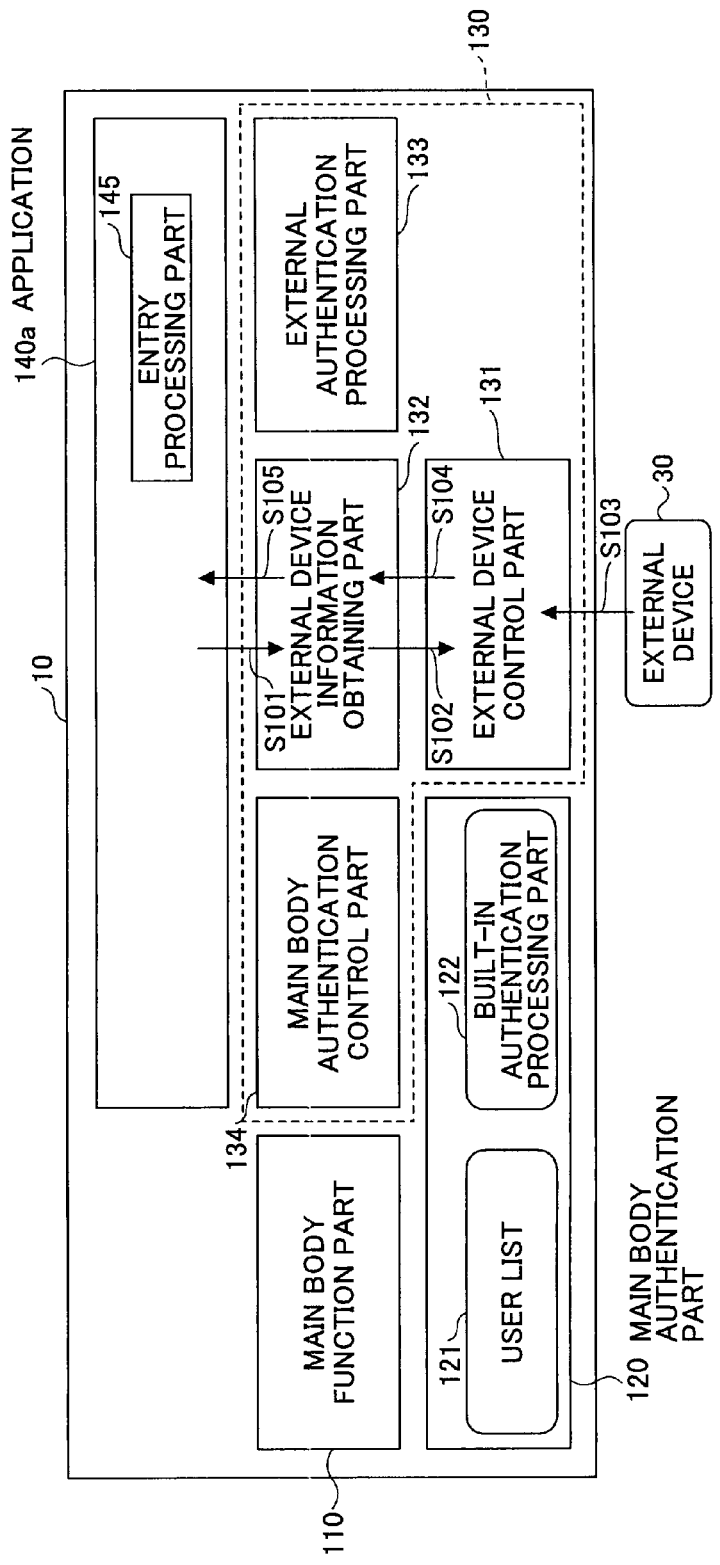
FIG. 5 is a diagram for illustrating a process in obtaining user information using the authentication framework according to the embodiment of the present invention.
Figure 6:
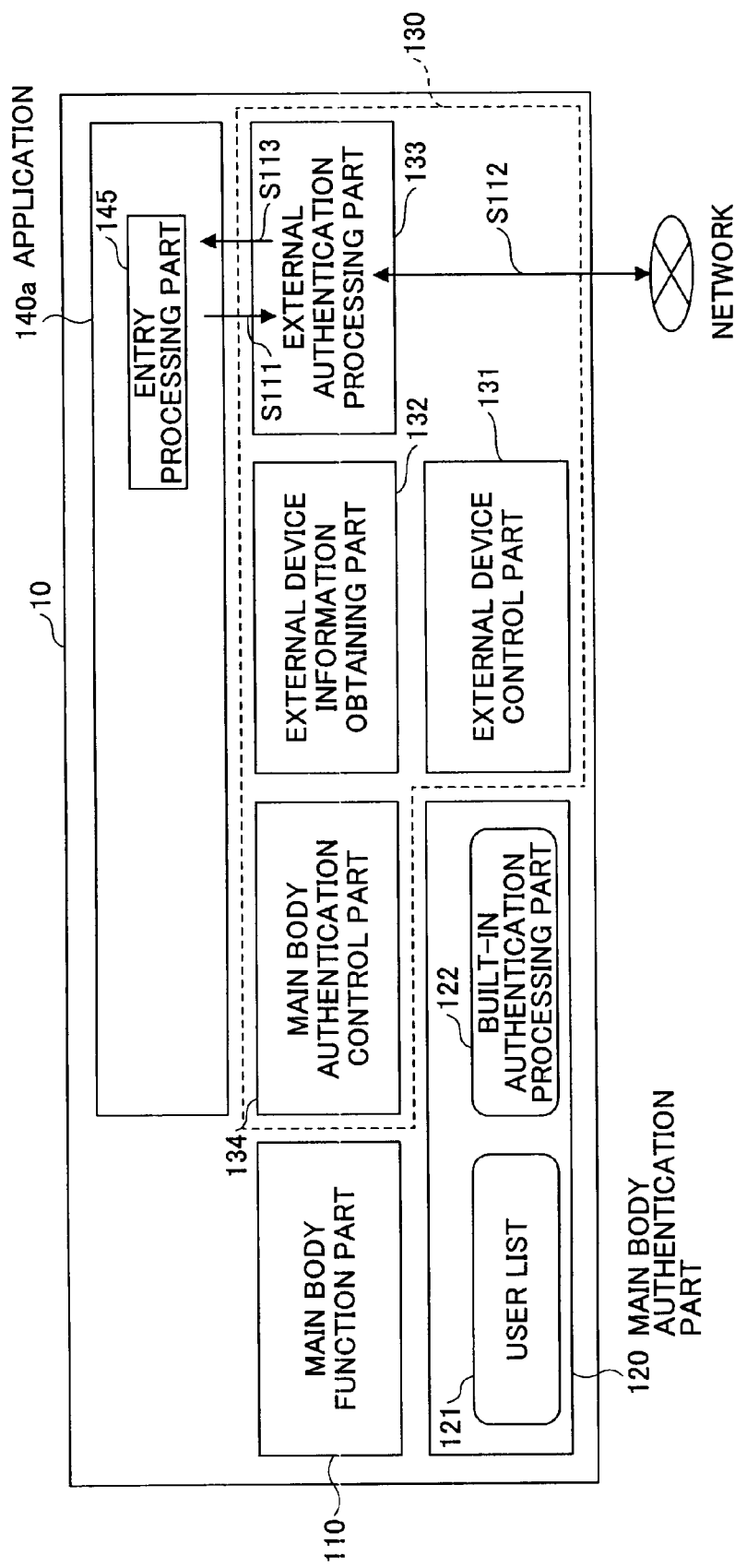
FIG. 6 is a diagram for illustrating a process in performing external authentication using the authentication framework according to the embodiment of the present invention.
Figure 7:
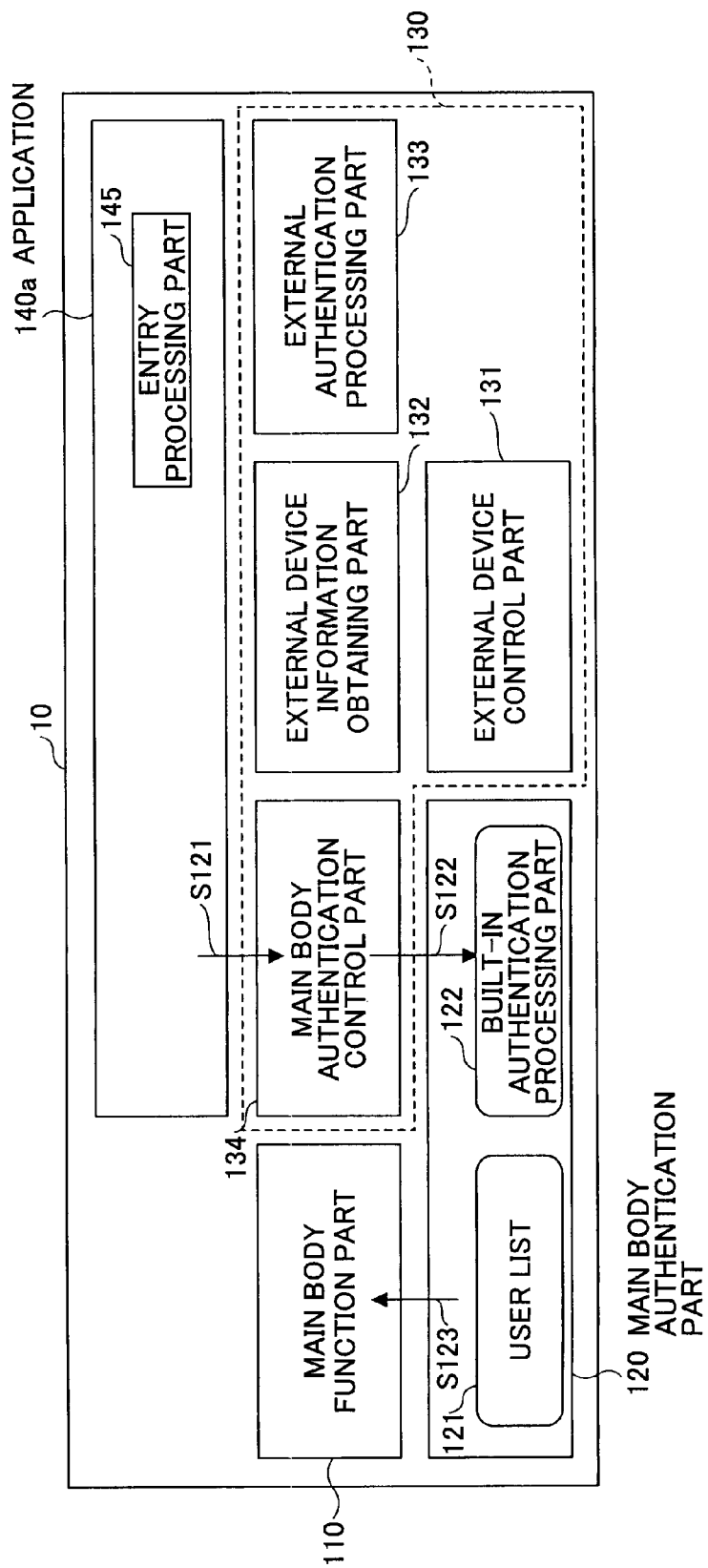
FIG. 7 is a diagram for illustrating a process in performing main body authentication using the authentication framework according to the embodiment of the present invention.

First, a description is given, with reference to FIG. 5, FIG. 6, and FIG. 7, of the processes for obtaining user information, external authentication, and main body authentication using the authentication framework.

FIG. 5 is a diagram for illustrating a process in obtaining user information using the authentication framework.

In step S101, the application 140a requests the external device information obtaining part 132 to obtain user information. In step S102, the external device information obtaining part 132 communicates with the external device control part 131 at the level of the information recording format in the external device 30, and requests the external device control part 131 to obtain user information.

Then, in step S103, the external device control part 131 communicates with the external device 30 at the level of the interface specifications of the external device 30, and obtains user information from the external device 30. Thereafter, the user information is returned to the application 140a, following the steps of calling in reverse order (S104 and S105).

Thus, the external device control part 131 and the external device information obtaining part 132 can be used alone from the application 140a. That is, there is no dependence between the external device control part 131 and the external device information obtaining part 132 and the other functional parts (the external authentication processing part 133 and the main body authentication control part 134), so that the obtained user information may be used in any manner in the application 140a.

Next, FIG. 6 is a diagram for illustrating a process in performing external authentication using the authentication framework.

In step S111, the application 140a makes a request for authentication with user information to the external authentication processing part 133. Next, in step S112, the external authentication processing part 133 communicates with an external authentication apparatus through the network to cause the external authentication apparatus to perform authentication based on the user information, and receives the result of the authentication. Then, in step S113, the external authentication processing part 133 returns the authentication result to the application 140a.

Thus, the external authentication processing part 133 can be used alone from the application 140a.

Next, FIG. 7 is a diagram for illustrating a processing procedure in performing main body authentication using the authentication framework.

In step S121, the application 140a makes a request for authentication with user information to the main body authentication control part 134. Next, in step S122, the built-in authentication processing part 122 performs authentication based on the user information and the user list 121 in response to the main body authentication control part 134 inputting the user information to the built-in authentication processing part 122. The screen transition at this point may be controlled from the main body authentication control part 134. If the authentication succeeds, in step S123, the main body authentication part 120 unlocks the main body function part 110. As a result, the user (application 140a) is allowed to use one or more functions of the image forming apparatus 10 based on the usage authority recorded in the user list 121.

Thus, the main body authentication control part 134 can be used alone from the application 140a.

Next, a description is given of a process that assumes a more specific situation (solution).

Figure 8:
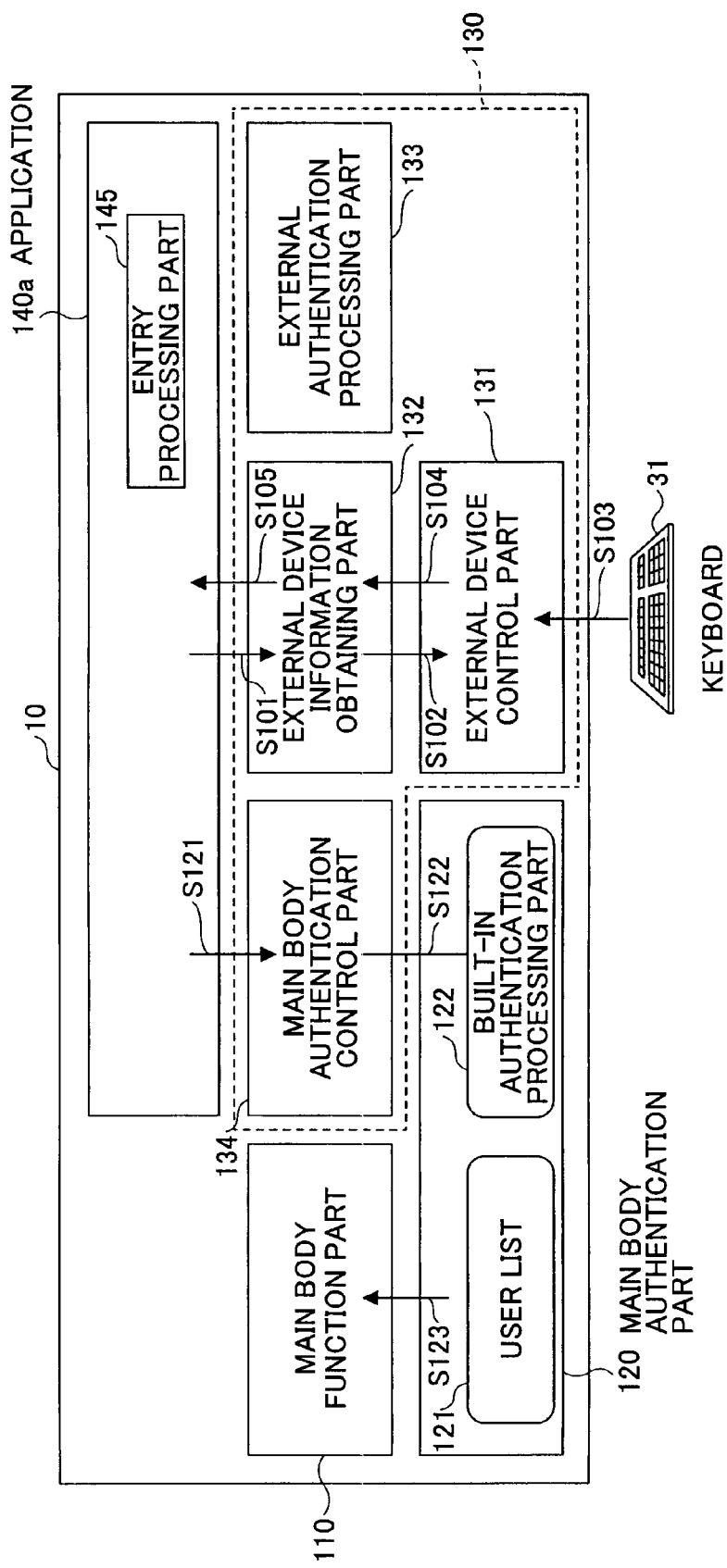
FIG. 8 is a diagram for illustrating a process in a first specific authentication example using the authentication framework according to the embodiment of the present invention.

FIG. 8 is a diagram for illustrating a processing procedure in a first specific authentication example using the authentication framework. In FIG. 8, the same steps as those of FIG. 5 or FIG. 7 are referred to by the same step numbers.

Referring to FIG. 8, a keyboard 31 is USB-connected to the image forming apparatus 10 as the external device 30. Such a mode is enabled by entering logic implementing modules for a keyboard in the authentication framework as the external device control implementing module 141 and the external device information obtaining implementing module 142 (FIG. 3) and entering a logic implementing module that inputs user information entered from the keyboard to the main body authentication part 120 in the authentication framework as the main body authentication control implementing module 144 (FIG. 3).

The application 140a obtains user information such as a username and a password entered through the keyboard 31 via the external device information obtaining part 132 and the external device control part 131 (steps S101 through S105).

Next, the main body authentication part 120 performs authentication in response to the application 140a making a request for authentication to the main body authentication control 134, using the obtained user information (steps S121 through S123).

Such a mode as FIG. 8 is effective as a solution for a low-spec image forming apparatus that does not have hardware such as a keyboard. Further, a device from which sufficient information may be obtained as user information, such as a USB memory, may also be used as the external device 30.

Figure 9:
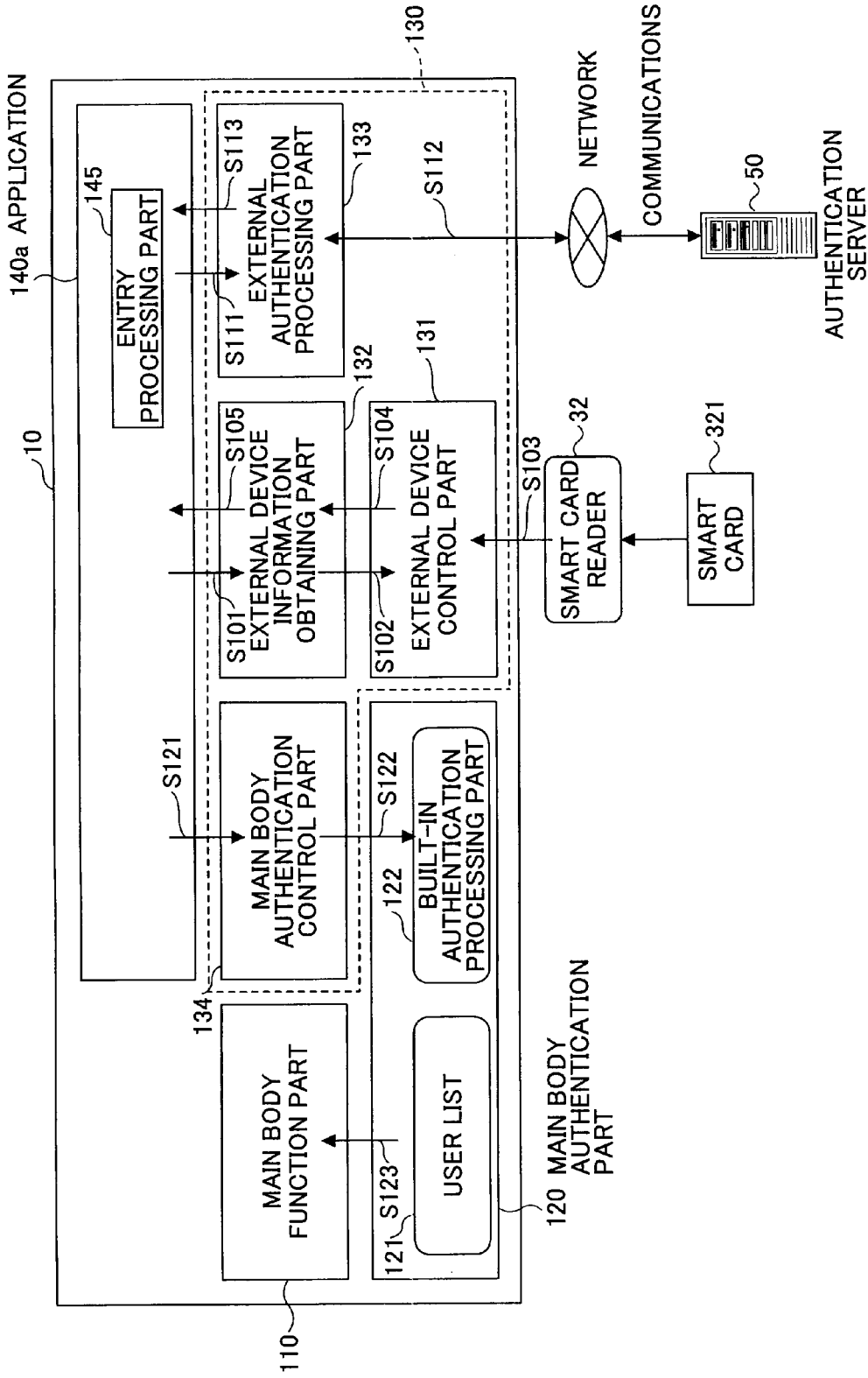
FIG. 9 is a diagram for illustrating a process in a second specific authentication example using the authentication framework according to the embodiment of the present invention.

Next, FIG. 9 is a diagram for illustrating a process in a second specific authentication example using the authentication framework. In FIG. 9, the same steps as those of FIG. 5, FIG. 6, or FIG. 7 are referred to by the same step numbers.

Referring to FIG. 9, a smart card reader 32 is USB-connected to the image forming apparatus 10 as the external device 30. Further, an authentication server 50 is connected to the image forming apparatus 10 through the network. Such a mode is enabled by entering logic implementing modules that obtain a card ID from a smart card 321 in the authentication framework as the external device control implementing module 141 and the external device information obtaining implementing module 142 (FIG. 3); entering a logic implementing module in the authentication framework as the external authentication processing implementing module 143 (FIG. 3), in which logic implementing module is implemented the processing of requesting authentication by transmitting the card ID to the authentication server, and obtaining user information corresponding to the card ID from the authentication server 50; and entering a logic implementing module that inputs user information obtained as a result of the authentication in the authentication server 50 to the main body authentication part 120 in the authentication framework as the main body authentication control implementing module 144 (FIG. 3).

Referring to FIG. 9, the application 140a obtains a card ID contained in the smart card 321 through the external device information obtaining part 132 and the external device control part 131 (steps S101 through S105). Next, in response to the application 140a transmitting the obtained card ID to the authentication server 50, the authentication server 50 performs authentication based on the card ID, and the authentication server 50 returns user information corresponding to the card ID, such as a username and a password (steps S111 through S113).

Next, the main body authentication part 120 performs authentication in response to the application 140a making a request for authentication to the main body authentication control part 134, using the user information returned from the authentication server 50 (steps S121 through S123).

In the case of FIG. 9, a solution with higher security may be implemented by providing a password entry screen in the screen transition of the main body authentication control implementing module 144 (FIG. 3) to be entered in the main body authentication control part 134, thereby incorporating a sequence that causes a user to enter a password using a keyboard as in FIG. 8 when the password entry screen is displayed.

When the authentication succeeds, the user can log on to the application 140*a* and use the application 140*a* within the usage authority of the user. According to the image forming apparatus 10 of this embodiment, it is possible to cause the authentication framework or the application 140*a* to appropriately control and manage the logon status. Here, the authentication framework can be incorporated (implemented) as desired with logic implementing modules, and the application 140*a* can also be incorporated as desired. Accordingly, the fact that it is possible to control and manage the logon status with the authentication framework or the application 140*a* means that a system for controlling or managing the logon status can be freely (flexibly) incorporated in accordance with a user's operation.

A description is given below of control and management of the logon status using the authentication framework. Examples of control of the logon status include automatic logoff. Examples of management of the logon status include detection of logon, detection of logoff, and getting or monitoring users that are currently logged on.

Figure 10:
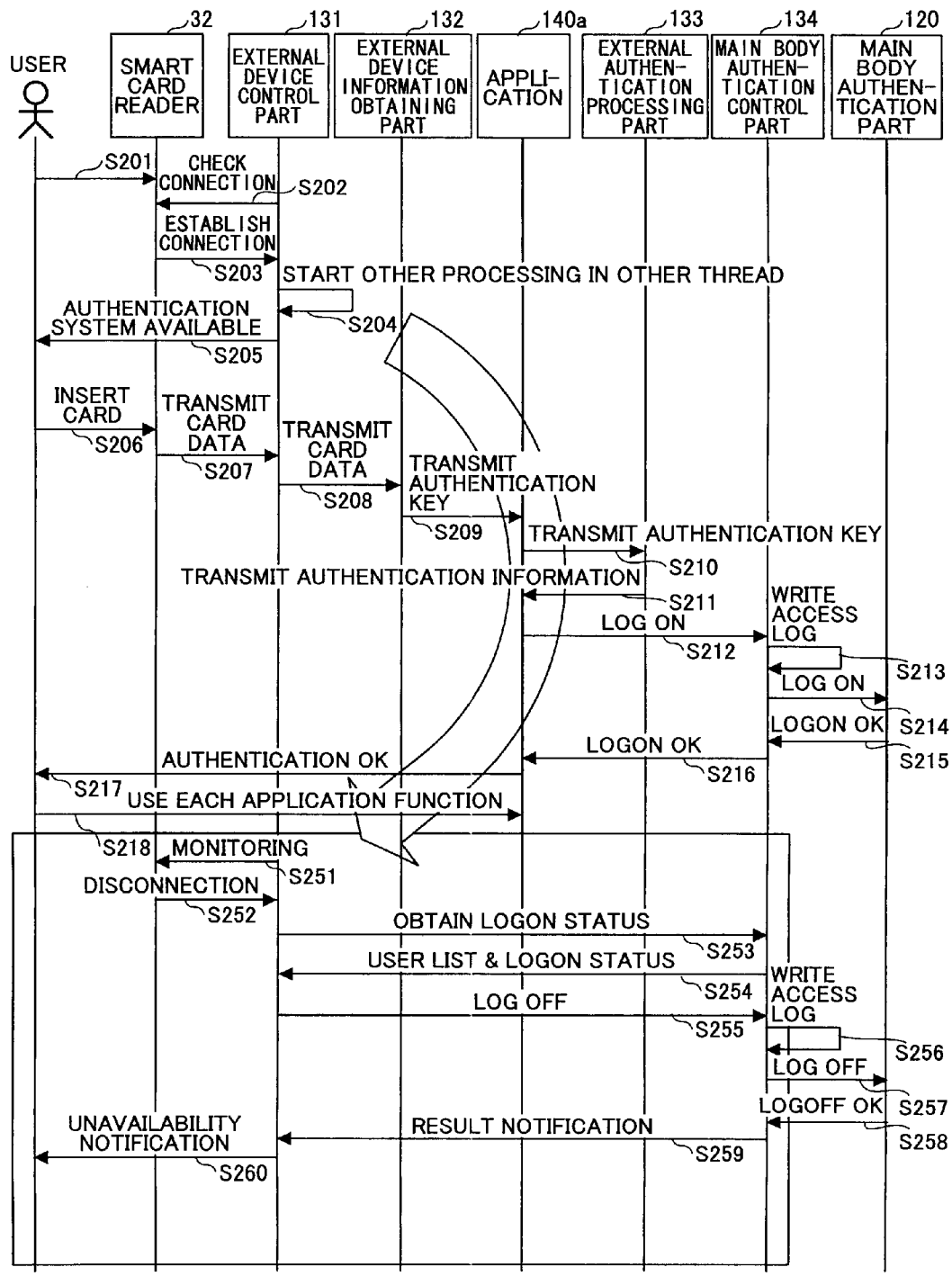
FIG. 10 is a sequence diagram for illustrating the processing of controlling and managing logon status by the authentication framework and an application according to the embodiment of the present invention.

FIG. 10 is a sequence diagram for illustrating the processing of controlling and managing the logon status by the authentication framework and the application 140*a*. In FIG. 10, steps S201 through S218 describe the processing in FIG. 9 in more detail.

For example, if a user enters a request to use the application 140*a* through the operations part 109 (FIG. 1) (step S201), the connection between the smart card reader 32 and the external device control part 131 is checked (step S202), and the connection is established (step S203).

Next, the external device control part 131 generates another thread for monitoring a status in the smart card reader 32 (step S204). Hereinafter, this thread is referred to as "status monitoring thread." The processing by the status monitoring thread is described in step S251 and subsequent steps. Next, the external device control part 131 notifies the user through the display part 108 (FIG. 1) that it is possible to perform authentication (step S205). For example, a message prompting insertion of the smart card 321 is displayed on the display part 108.

When the user inserts the smart card 321 into the smart card reader 32 (step S206), a card ID contained in the smart card 321 is obtained by the external device control part 131 (step S207). The application 140*a* is notified of the obtained card ID through the external device information obtaining part 132 (steps S208 and S209). The application 140*a* makes a request for authentication to the external authentication processing part 133 by transmitting the card ID to the external authentication processing part 133. The external authentication processing part 133 transmits the card ID to the authentication server 50 through the network, and receives user information in accordance with the result of the authentication in the authentication server 50.

Next, the external authentication processing part 133 transmits the received user information to the application 140*a* (step S211). The application 140*a* makes a request for authentication (logon request) to the main body authentication control part 134 based on the user information (step S212). In response to the logon request, the main body authentication control part 134 records occurrence of the logon of the user as an access log entry in the recording medium 103 (step S213). For example, a username and time related to the logon are recorded.

Next, the main body authentication control part 134 causes the main body authentication part 120 to perform main body authentication (built-in authentication) by making a logon request (inputting the user information) to the main body authentication part 120, and receives the result of the authentication (step S215). The main body authentication control part 134 can detect the success of the logon based on the result. Accordingly, it is possible to manage the logon status of the user (information indicating that the user is logging on) in the main body authentication control part 134. The logon status is recorded in the recording medium 103 by the main body authentication control part 134, for example.

Next, the main body authentication control part 134 notifies the application 140*a* of the result of the logon (authentication) (step S216). This notification enables the application 140*a* to detect the success of the logon.

Next, the application 140*a* notifies the user of the logon result by causing the logon result to be displayed on the display part 108 (step S217). In the case of a logon success, the application 140*a* offers functions in accordance with the user's input (S218).

On the other hand, the external device control part 131 related to the status monitoring thread continuously monitors the connection status of the smart card reader 32 once activated (step S251). For example, the external device control part 131 periodically obtains the card ID from the smart card 321. Accordingly, for example, if the smart card 321 is extracted from the smart card reader 32 so that the connection to the smart card 321 is interrupted (step S252), the external device control part 131 is prevented from obtaining user information and can therefore detect the extraction of the smart card 321. In response to this detection, the status monitoring thread makes a request to obtain the logon status to the main body authentication control part 134 (step S253). The main body authentication control part 134 returns the logon status managed by the main body authentication control part 134 (step S254). Here, multiple logon statuses may be returned for each user. This is because there may be a user who is also logged on to the application 140*a* through the network.

The external device control part 131 makes a request for the logoff of the logged-on user to the main body authentication control part 134 based on the obtained logon status (step S255). Here, the term "logoff" means restricting or prohibiting usage by canceling or invalidating the authenticated state. Here, the users who are caused to log off may be limited to the user who has logged on through the external device control part 131 (that is, with the smart card 321) or may be all users who are currently logged on. The users who are caused to log off may be suitably determined in accordance with the form of use.

In response to the logoff request, the main body authentication control part 134 records occurrence of the logoff as an access log entry in the recording medium 103 (step S256). For example, a username and time related to the logoff are recorded.

Next, the main body authentication control part 134 causes logoff in the main body authentication part 120 to be executed by making a logoff request to the main body authentication part 120 (step S257), and receives its result (step S258). The main body authentication control part 134 can detect the success of the logoff based on the result. Accordingly, it is possible to update or delete the logon status of a user in the main body authentication control part 134.

Next, the main body authentication control part 134 notifies the external device control part 131 of the result of the logoff (step S259). In the case of a logoff success, the external device control part 131 notifies the user through the display part 108 that the application 140*a* is no longer available (step S217).

FIG. 10 shows an example of the form of use where logoff is automatically executed in response to interruption of the connection with the external device 30. By implementing such an automatic logoff function, it is possible to prevent illegal use resulting from forgetting to log off. Further, it is also possible to implement such a form of use as forcing a specific user to log off.

The interruption of the connection with the external device 30 includes extraction of a USB memory.

Further, in the case of using external authentication, the external authentication processing part 133 may periodically make a request for authentication to the authentication server 50 and logoff may be executed if the authentication fails.

Further, if charging is managed, logoff may be executed when the amount of money deposited (registered) in advance becomes zero where charging is based on the use of the application 140*a*.

Further, the application 140*a* may set a logoff time in the main body authentication control part 134 at the time of the logon request of step S212. In this case, the main body authentication control part 134 executes logoff in response to passage of the time set as the logoff time since the time of logon or in response to no inputting (operation) by the user for the period set as the logoff time.

Further, the application 140*a* may make a request to the main body authentication control part 134 for locking the logon status at the time of the logon request of step S212. In this case, the main body authentication control part 134 ignores a logon request by a new user or a logoff request by a currently logged-on user until a request for unlocking the logon status is made. Accordingly, it is possible to prevent logon (including remote logon) by a new user when the administrator wishes to log on and work while excluding others in the case of performing, for example, a backup operation. Further, it is possible to prevent forced logoff when a logoff button (hereinafter referred to as "logoff key") provided in the operations part 109 (FIG. 1) is erroneously pressed.

Further, if the image forming apparatus 10 has an energy-saving mode, the image forming apparatus 10 may be configured to automatically return from the energy-saving state (mode) in response to occurrence of the logon request of step S212. This makes it possible to log on to the application 140*a* without pressing a button for returning from the energy-saving state in the operations part 109.

Further, the application 140*a* may set the usage authority of a user to log on in the main body authentication control part 134 at the time of the logon request of step S212. In this case, the main body authentication control part 134 gives priority to the set usage authority over the usage authority recorded in the user list 121 in restricting use.

This makes it possible to flexibly manage usage authority in accordance with the form of use by a user. Further, in this case, it is possible to restrict usage by a user without registering the user's usage authority with the user list 121 in advance.

In FIG. 10, a description is given of the case of executing logoff in a software manner. Next, a description is given of a process in the case where logoff is requested in a hardware manner (that is, in the case where the logoff key is pressed).

Figure 11:
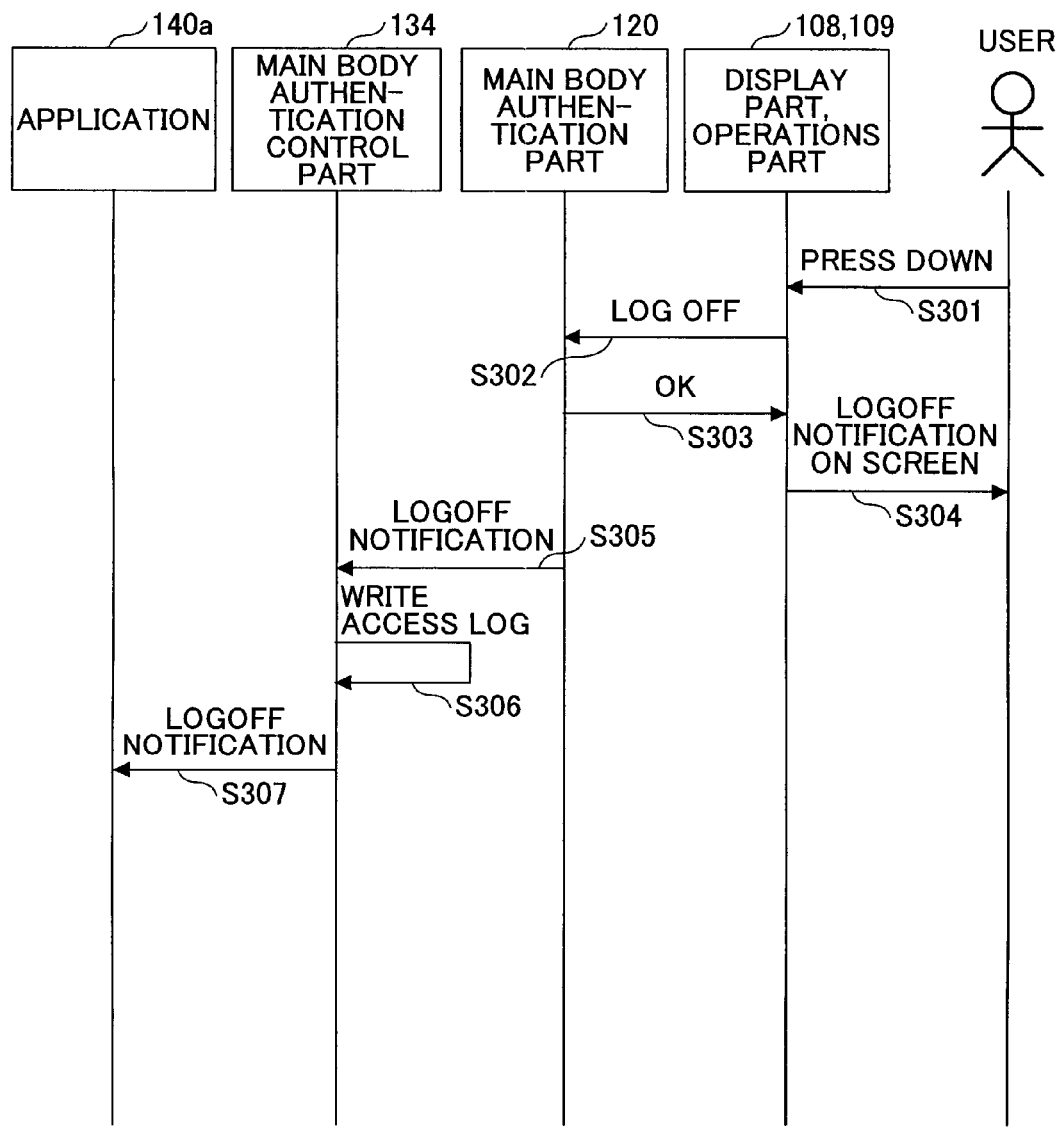
FIG. 11 is a sequence diagram for illustrating a process in the case where logoff is requested in a hardware manner according to the embodiment of the present invention.

FIG. 11 is a sequence diagram for illustrating a process in the case where logoff is requested in a hardware manner.

If a user presses the logoff key when the user has already logged on to the application 140*a* (step S301), the operations part 109 transmits a logoff request to the main body authentication part 120 (step S302). The main body authentication part 120 performs logoff processing, and requests the display part 108 to display its result (step S303). The display part 108 causes a screen showing completion of logoff to be displayed (step S304).

On the other hand, after successfully performing the logoff processing, the main body authentication part 120 notifies the main body authentication control part 134 that the user has logged off (step S305). In response to this notification, the main body authentication control part 134 records occurrence of the user's logoff as an access log entry (step S306). Next, the main body authentication control part 134 notifies the application 140*a* of the logoff (step S307). This enables the application 140*a* to detect logoff. Accordingly, if there is processing desired to be executed in response to detection of logoff in the application 140*a* as processing requested in a form of use, this processing can be executed in this timing.

As described above, according to the image forming apparatus 10 of this embodiment, with the authentication framework, it is possible to flexibly determine (select) where to obtain user information or a server to be caused to execute authentication in accordance with operations. Accordingly, it is also possible to restrict usage of the image forming apparatus 10 using the authentication system that has already been constructed in the user environment.

Further, it is possible to flexibly achieve a form of control and management of the logon status of a user suitable for the user's operation by implementing one or more Logic implementing modules and/or one or more applications.

Thus, according to one aspect of the present invention, it is possible to achieve a flexible authentication function. Further, it is possible to provide an information processor and an authentication control method capable of achieving a flexible authentication function, and a storage medium storing a program for causing a computer to execute the authentication control method.

The present invention is not limited to the specifically disclosed embodiment, and variations and modifications may be made without departing from the scope of the present invention.

The present application is based on Japanese Priority Patent Application No. 2007-235769, filed on Sep. 11, 2007, the entire contents of which are hereby incorporated by reference.

What is claimed is:
1. An image forming apparatus, comprising:
a plurality of receiving units, each of the receiving units being configured to receive information for user authentication;
a plurality of authentication process units, each of the authentication process units being configured to execute a corresponding user authentication process, of a plurality of user authentication processes, based on the information received by at least one of the plurality of receiving units;
a registry unit configured to register a user authentication process to be executed; and
an authentication unit configured to execute the registered user authentication process, wherein each of the plurality of authentication process units executes the corresponding user authentication process using different information.

2. The image forming apparatus according to claim 1, wherein one of the plurality of user authentication process units executes the corresponding user authentication process based on information read from a recording medium, and wherein another one of the plurality of user authentication process units executes the corresponding user authentication process based on information provided by the user.

3. The image forming apparatus according to claim 1, wherein one of the plurality of user authentication process units executes the corresponding user authentication process based on information read from a recording medium, and wherein another one of the plurality of user authentication process units executes the corresponding user authentication process based on the information read from the recording medium and information provided by the user.

4. The image forming apparatus according to claim 1, wherein one of the plurality of user authentication process units executes the corresponding user authentication process based on information provided by the user, and wherein another one of the plurality of user authentication process units executes the corresponding user authentication process based on information read from a recording medium and the information provided by the user.

5. The image forming apparatus according to claim 1, wherein one of the plurality of authentication process units executes the corresponding user authentication process based on information read from a recording medium, and wherein another one of the plurality of authentication process units executes the corresponding user authentication process based on information provided by the user, and a further one of the plurality of authentication process units executes the corresponding user authentication process based on the information read from a recording medium and the information provided by the user.

6. The image forming apparatus according to claim 2, wherein the user authentication process that is executed based on information read from the recording medium is executed based on user information corresponding to a recording medium identification information that is read from the recording medium, and
wherein the user authentication process that is executed based on the information provided by the user is executed based on user information input by the user.

7. The image forming apparatus according to claim 3, wherein the user authentication process that is executed based on information read from the recording medium is executed based on user information corresponding to a recording medium identification information that is read from the recording medium, and
wherein the user authentication process that is executed based on the information read from the recording medium and the information provided by the user is executed based on user information corresponding to recording medium identification information that is read from the recording medium and a password provided by the user.

8. The image forming apparatus according to claim 4, wherein the user authentication process that is executed based on the information provided by the user is executed based on user information provided by the user, and
wherein the user authentication process that is executed based on the information read from the recording medium and the information provided by the user is executed based on user information corresponding to recording medium identification information that is read from the recording medium and a password provided by the user.

9. The image forming apparatus according to claim 5, wherein the user authentication process that is executed based on information read from the recording medium is executed based on user information corresponding to a recording medium identification information that is read from the recording medium,
wherein the user authentication process that is executed based on the information provided by the user is executed based on user information input by the user, and
wherein the user authentication process that is executed based on the information read from the recording medium and the information provided by the user is executed based on user information corresponding to the recording medium identification information that is read from the recording medium and a password provided by the user.

10. The image forming apparatus according to claim 1, wherein the apparatus is an image forming apparatus.

11. A method executed by an image forming apparatus, comprising:
receiving, by one of a plurality of receiving units, information for user authentication, wherein each of a plurality of authentication process units is configured to execute a corresponding user authentication process of a plurality of user authentication processes based on the information received by at least one of the plurality of receiving units;
registering a user authentication process to be executed; and
executing the registered user authentication process,
wherein each of the plurality of authentication process units executes the corresponding user authentication process using different information.

12. The method according to claim 11, wherein one of the plurality of user authentication process units executes the corresponding user authentication process based on information read from a recording medium, and wherein another one of the plurality of user authentication process units executes the corresponding user authentication process based on information provided by the user.

13. The method according to claim 11, wherein one of the plurality of user authentication process units executes the corresponding user authentication process based on information read from a recording medium, and wherein another one of the plurality of user authentication process units executes the corresponding user authentication process based on the information read from the recording medium and information provided by the user.

14. The method according to claim 11, wherein one of the plurality of user authentication process units executes the corresponding user authentication process based on information provided by the user, and wherein another one of the plurality of user authentication process units executes the corresponding user authentication process based on information read from a recording medium and the information provided by the user.

15. The method according to claim 11, wherein one of the plurality of authentication process units executes the corresponding user authentication process based on information read from a recording medium, and wherein another one of the plurality of authentication process units executes the corresponding user authentication process based on information provided by the user, and a further one of the plurality of authentication process units executes the corresponding user authentication process based on the information read from a recording medium and the information provided by the user.

16. The method according to claim 12, wherein the user authentication process that is executed based on information read from the recording medium is executed based on user information corresponding to a recording medium identification information that is read from the recording medium, and
    wherein the user authentication process that is executed based on the information provided by the user is executed based on user information input by the user.

17. The method according to claim 13, wherein the user authentication process that is executed based on information read from the recording medium is executed based on user information corresponding to a recording medium identification information that is read from the recording medium, and
    wherein the user authentication process that is executed based on the information read from the recording medium and the information provided by the user is executed based on user information corresponding to recording medium identification information that is read from the recording medium and a password provided by the user.

18. The method according to claim 14, wherein the user authentication process that is executed based on the information provided by the user is executed based on user information provided by the user, and
    wherein the user authentication process that is executed based on the information read from the recording medium and the information provided by the user is executed based on user information corresponding to recording medium identification information that is read from the recording medium and a password provided by the user.

19. The method according to claim 15, wherein the user authentication process that is executed based on information read from the recording medium is executed based on user information corresponding to recording medium identification information that is read from the recording medium,
    wherein the user authentication process that is executed based on the information provided by the user is executed based on user information input by the user, and
    wherein the user authentication process that is executed based on the information read from the recording medium and the information provided by the user is executed based on user information corresponding to the recording medium identification information that is read from the recording medium and a password provided by the user.

20. An authentication system, comprising:
a first apparatus configured to execute a user authentication process; and
a second apparatus connected to the first apparatus through a network,
wherein the first apparatus includes a first authentication process unit configured to execute the user authentication process, and
wherein the second apparatus is an image forming apparatus and includes:
    a plurality of receiving units, each of the plurality of the receiving units being configured to receive information for the user authentication process;
    a second authentication unit configured to execute the user authentication process;
    a registry unit configured to register the user authentication process to be executed among the plurality of user authentication processes; and
    an authentication control unit configured to execute the registered user authentication process,
    wherein each of the plurality of user authentication processes is configured to execute the user authentication by either one of the first authentication unit and the second authentication unit, the corresponding user authentication process using different information.

* * * * *